Jan. 21, 1936. R. C. RUPP 2,028,477
HOOK HOLDER FOR FISH POLES
Filed July 10, 1933
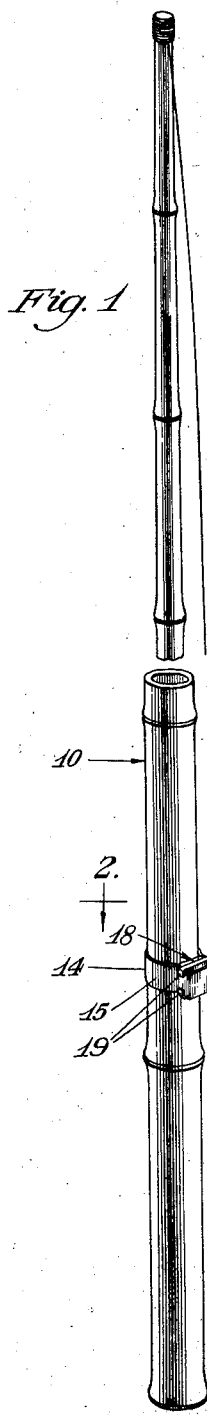
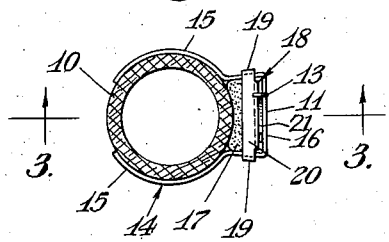
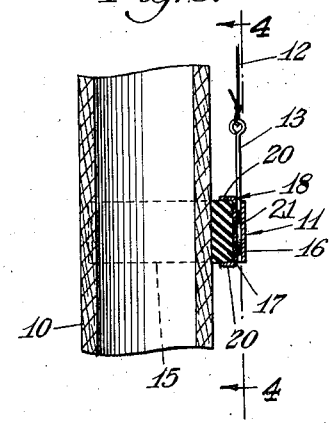
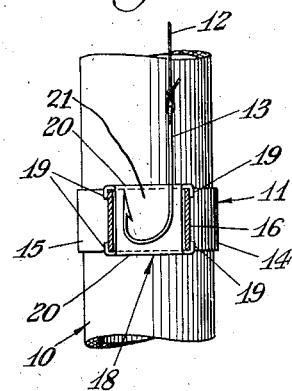
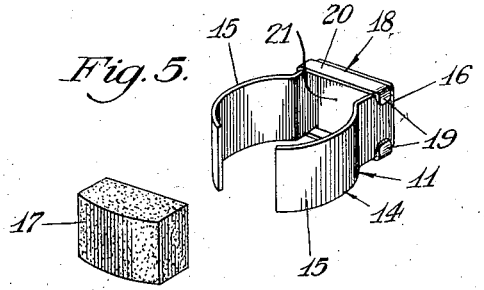
Raymond C. Rupp.
INVENTOR
BY Victor J. Evans & Co.
HIS ATTORNEYS Patented Jan. 21, 1936

2,028,477

UNITED STATES PATENT OFFICE 2,028,477

HOOK HOLDER FOR FISH POLES

Raymond C. Rupp, Kendallville, Ind.

Application July 10, 1933, Serial No. 679,799

3 Claims. (Cl. 43—33)

This invention relates to certain novel improvements in hook holders for fish poles, and has for its principal object the provision of an improved construction of this character which will be highly efficient in use and economical in manufacture.

An object of this invention is to provide an improved device adapted for attachment to a fish pole having a line attached thereto and a hook at one end of the line whereby to hold the fish hook against movement relative to the pole and to prevent the barb of the hook from accidentally becoming caught or engaged when not in use.

Other objects will appear hereinafter.

In the drawing:

Fig. 1 is a perspective view showing a preferred form of the new device attached to a conventional fish pole;

Fig. 2 is a transverse horizontal sectional view on line 2—2 in Fig. 1;

Fig. 3 is a fragmentary vertical sectional view on line 3—3 in Fig. 2;

Fig. 4 is a fragmentary vertical sectional view on line 4—4 in Fig. 3; and

Fig. 5 is a perspective view of a preferred form of the new device showing the parts thereof disassembled.

A conventional fish pole or rod is indicated at 10 in the drawing having a line 12 attached thereto and a hook 13 at one end of the line. A preferred form of the new hook holder device is indicated generally at 11, and includes a U-shaped clamp 14 having a pair of yieldable spring jaws 15 adapted to embrace and cling to the pole 10. Formed by extensions of the clamp jaws 15 and by a bight portion that extends between the jaws 15 of the U-shaped clamp 14 is a receptacle portion 16.

Arranged in the receptacle portion 16 is a resilient, compressible member in the form of a block 17 of resilient material, which is preferably sponge rubber or the like. This block 17 is carried by a frame 18 which is slidably mounted on the receptacle portion 16 of the clamp 14. The frame 18 includes a pinch plate 21 and has extensions 19 (Fig. 4) angled over the walls of the receptacle portion 16 to slidably guide both the frame 18 and the rubber block 17 in the receptacle portion 16 of the clamp 14, and the frame 18 has extensions 20 angled over the block 17 (Fig. 3) to hold the block in position in the frame.

In the use of the device, the resilient block 17 is arranged in the frame 18 between the pinch plate 21 and the fish pole 10 and the frame is arranged in the receptacle portion 16 of the clamp 14 as shown, and the yieldable arms 15 of the clamp 14 are arranged in embracing relation about the pole 10 as shown.

To hold the hook 13 to the pole 10 against accidental displacement therefrom and against becoming accidentally lodged in the clothing or body of the user, the hook is inserted between the pinch plate 21 of the frame 18 and the bight portion of the clamp 11 as shown, thereby slightly compressing the resilient block 17 and forcing the same against the adjacent wall of the pole 10 whereby the block 17 acts by its own resiliency to bind the hook 13 securely between the pinch plate 21 and the adjacent wall of the receptacle portion 16 of the clamp 11; thus preventing accidental displacement of the hook from the pole and preventing lodgment of the hook in the clothing or in the body of the person using the same.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A fish pole attachment comprising the combination with a fish pole having a fish line and hook attached thereto of: a clamping member adapted to be attached to the fish pole and including a receptacle portion; a pinch plate slidably mounted in the said receptacle portion; and a resilient compressible material arranged between the said pinch plate and the adjacent wall of the fish pole; whereby the hook of the fish line may be readily inserted between the said pinch plate and the adjacent wall of the receptacle portion, thereby slightly compressing the resilient member and causing the latter to act by its own resiliency to bind the hook between the pinch plate and the adjacent wall of the receptacle portion.

2. A fish pole attachment comprising the combination with a fish pole having a fish line and hook attached thereto of: a clamping member adapted to be attached to the fish pole and including a receptacle portion; a pinch plate slidably mounted in the said receptacle portion; and a block of resilient, compressible rubber arranged between the said pinch plate and the adjacent wall of the fish pole; whereby the hook of the fish line may be readily inserted between the said pinch plate and the adjacent wall of the receptacle portion, thereby slightly compressing the resilient member and causing the latter to act by its own resiliency to bind the hook between the pinch plate and the adjacent wall of the receptacle portion.

3. The combination with a fish pole having a fish line and a hook attached thereto, of a backing plate connected with the pole, a pinch plate, and resilient means positioned between the pinch plate and the pole for urging the pinch plate in the direction of the backing plate, to pinch the fish hook positioned between the two plates and frictionally hold the hook therebetween.

RAYMOND C. RUPP.